United States Patent
Hoepner (10) Patent No.: US 9,187,261 B2
(45) Date of Patent: Nov. 17, 2015

(54) DEVICE AND METHOD FOR ROTATING FLAT PRODUCTS

(71) Applicant: BOEWE SYSTEC GmbH, Augsburg (DE)

(72) Inventor: Bernd Hoepner, Augsburg (DE)

(73) Assignee: BOEWE SYSTEC GMBH, Augsburg (DE)

( * ) Notice: Subject to any disclaimer, the term of this patent is extended or adjusted under 35 U.S.C. 154(b) by 0 days.

(21) Appl. No.: 14/134,241

(22) Filed: Dec. 19, 2013

(65) Prior Publication Data

US 2014/0178170 A1    Jun. 26, 2014

(30) Foreign Application Priority Data

Dec. 20, 2012 (DE) .......................... 10 2012 112 718

(51) Int. Cl.
| | |
|---|---|
| *B65H 7/02* | (2006.01) |
| *B65G 47/244* | (2006.01) |
| *B65H 5/06* | (2006.01) |
| *B65H 7/00* | (2006.01) |
| *B65H 9/00* | (2006.01) |

(52) U.S. Cl.
CPC ............ *B65G 47/2445* (2013.01); *B65H 5/062* (2013.01); *B65H 7/00* (2013.01); *B65H 9/002* (2013.01); *B65H 2301/33222* (2013.01); *B65H 2301/3411* (2013.01); *B65H 2301/34112* (2013.01); *B65H 2404/144* (2013.01); *B65H 2511/216* (2013.01); *B65H 2513/11* (2013.01); *B65H 2513/53* (2013.01)

(58) Field of Classification Search
USPC ................................. 271/185, 228
See application file for complete search history.

(56) References Cited

U.S. PATENT DOCUMENTS

| | | | |
|---|---|---|---|
| 3,758,104 | A | 9/1973 | Daily |
| 4,901,842 | A | 2/1990 | Lemboke et al. |
| 5,931,462 | A | 8/1999 | Delfosse |
| 6,647,884 | B1 | 11/2003 | La Vos et al. |
| 7,611,142 | B2 | 11/2009 | Kawashima et al. |
| 2007/0235920 | A1 | 10/2007 | Kawashima et al. |
| 2008/0048386 | A1* | 2/2008 | Smith ........................... 271/194 |
| 2009/0107892 | A1 | 4/2009 | Clendinning et al. |
| 2011/0132722 | A1* | 6/2011 | Depoi et al. ................... 198/373 |

FOREIGN PATENT DOCUMENTS

| | | |
|---|---|---|
| DE | 8519708 | 9/1985 |
| DE | 3718206 | 12/1988 |

(Continued)

*Primary Examiner* — Howard Sanders
(74) *Attorney, Agent, or Firm* — Fleit Gibbons Gutman Bongini & Bianco PL; Martin Fleit; Paul D. Bianco (57) ABSTRACT

A device for rotating flat products, in particular sheets or stacks of sheets, moved in a first direction from a first orientation into a second orientation, by a predetermined total rotation angle, by means of a first rotating device, in which the product is rotated first by a first rotation angle, and by means of at least one second rotating device, in which the product is later rotated by a second rotation angle. The first and second rotating devices are arranged one after the other in transport direction, and each rotating device includes rotating elements, which engage with the product for the rotating process. In order to be able to process products having different formats at the highest possible throughput and as failure-free as possible, and in order to ensure as mild a treatment of the products as possible, at least the first rotating device includes switchable engagement elements by means of which the rotating elements can be engaged with or disengaged from the product at selected times.

22 Claims, 8 Drawing Sheets

(56) References Cited

FOREIGN PATENT DOCUMENTS

| DE | 4125342 | 2/1993 |
| EP | 0814041 | 12/1997 |
| EP | 1110888 | 6/2001 |
| EP | 1842813 | 10/2007 |

\* cited by examiner

DEVICE AND METHOD FOR ROTATING FLAT PRODUCTS

CROSS REFERENCE TO RELATED APPLICATIONS

This application claims priority under 35 U.S.C. §119 to German Patent Application No. DE 10 2012 112 718.2 filed Dec. 20, 2012, the entire contents of which are incorporated herein by reference.

FIELD OF THE INVENTION

The invention pertains to a device for rotating flat products moving in a transport direction as well as to a corresponding method.

BACKGROUND OF THE INVENTION

Devices of this type are used, for example, in paper-processing machines, such as enveloping machines, printers or copiers, for example. The products to be rotated can be, for example, individual sheets or sheets of paper, or a stack of sheets consisting of at least two sheets. However, devices of this type can also be used for rotating other flat products, such as, for example, for rotating plastic films, cardboard sheets or the like, or also for rotating bound or stapled sheets in the form of catalogs, brochures, notebooks or similar products.

From U.S. Pat. No. 3,758,104, a device for rotating rectangular cardboard sheets by 90° is known, wherein the sheets are deposited in a predetermined orientation for further processing in a container. This known device comprises a conveyor belt that is moved at a first speed in a transport direction, in order to move the cardboard sheets to be rotated by an angle of 90° in a first orientation toward a rotating device. The rotating device has a first slit and a second slit, wherein a first section of the cardboard sheet to be rotated is engaged in the first slit, and a second section of the cardboard sheet is engaged in the second slit. The first slit here comprises a first pressure roller, which defines a slit between its outer periphery and the conveyor belt, in which the first section of the cardboard sheet is engaged. The second slit is defined by a rotating roller pair with a driven rotating roller and a pressure roller, between the outer periphery of which the second section of the cardboard sheet to be rotated engages. The driven roller of the rotating roller pair is driven in order to rotate the cardboard sheet at a speed that is different from the transport speed of the transport track.

EP 0 814 041 B1 discloses a method for rotating sheets from a first orientation into an orientation that is perpendicular to the former orientation as well as a sheet stacking device, in which sheets to be stacked according to the method are rotated from a first orientation into an orientation that is perpendicular to the former orientation. The sheets to be rotated are moved evenly during the rotating between a position located upstream and a position located downstream, and are moved differentially in an intermediate movement phase without any change in the speed component in the advance direction of the sheet. In the intermediate movement phase (rotating phase), the sheet is moved with a speed-time profile that includes a first speed function at which the movement speed is increased temporarily by a certain amount, and a second speed function at which the movement speed is decreased temporarily by the same predetermined amount, and at the same time, in order to rotate the sheet by an angle of rotation, wherein the amount of the rotation angle is determined by the duration of the increased or reduced movement speed. Simultaneously with the rotation of the sheet, a lateral shift occurs, which is determined by the fact that the time at which the rotation of the sheet is started is selected appropriately, with regard to the arrival of the sheet at a fixed reference point. The rotation of the sheet here occurs by means of a rotating device, which comprises, transversely to the advance direction of the sheet, mutually spaced roller pairs, which are driven by a step motor, in order to produce the predetermined speed-time profiles of the roller pairs.

These devices and methods known from the prior art for rotating flat products, such as, sheets, stacks of sheets, or paper sheets, can be used only at relatively low transport speeds of the product to be rotated owing to the accelerations and decelerations that occur during the rotating process. In modern paper-processing machines with high throughput numbers on the order of 100,000 products per hour, the products to be rotated have to be strongly decelerated and accelerated again during the rotating process if the rotating process by a certain rotation angle, 90°, for example, is carried out in a single rotating step. To prevent strong decelerations and accelerations of the product, it is already known in the prior art to divide the entire rotating process into two or more partial steps.

Dividing the entire rotating process into two or more partial steps makes it possible, at a very high cycle output or decreasing cycle time, for more time and more space to be available for the individual rotating processes. The cycle output can be increased in the case of a division of the entire rotating process into two or more partial steps, because the subsequent product can already be introduced into the first rotation device while the preceding product is still in the rotating process in a downstream rotating device.

Thus, for example, DE 3718206 A1 discloses a transport device for rotating stacks of sheets moved along a turning section, which comprises a turning conveyor consisting of conveyor belts that extend next to one another in two tracks and are driven at different speeds, wherein a first track comprises a circulating conveyor belt that can be driven at a first speed, and the second track comprises at least two circulating conveyors one after the other in the transport direction, which are driven at a speed different from the first speed. Due to the different speeds of the first track and the several conveyors of the second track, a rotation by a certain predetermined rotation angle occurs of the stack of sheets resting on the two tracks, which angle depends on the difference in the speeds of the first track and of the second track. Here the conveyor belts of the first track and of the second track are provided in each case with bristles on their upper side that supports the stack of sheets, in order to ensure a satisfactory adhesion between the upper side of the conveyor belts and the bottom side of the stack of sheets. The adhesion of the stack of sheets to the conveyor belt is here permanent. This can lead to problems during the transfer of a stack of sheets from a conveyor of the second track to a subsequent conveyor of the second track, since the stack of sheets, at least for a short time, is engaged simultaneously in two conveyors, which each exert a possibly different torque on the stack of sheets. This can lead to buckling or stretching of the sheet or to a slipping of the stack of sheets.

US2009/0107892A1 discloses a device for rotating mail items, which are moved along a transport track, from a first orientation into a second orientation. The device comprises several roller pairs arranged one after the other in the transport direction, which are arranged with a mutual spacing in the transverse direction relative to the transport direction. The roller pairs, which are arranged at a transverse separation from one another, are driven, for the purpose of rotating the mail items, at different speeds, wherein a rotation by a predetermined rotation angle, which depends on the speed difference of the roller pairs that can be different for each roller pair, is imparted to the mail item in each of the roller pairs. The arrangement of the roller pairs comprises, at the beginning and the end, in each case one roller pair by means of which the mail item is not rotated but is continued to be moved linearly in the transport direction. During the rotating of a mail item by the roller pairs arranged at a mutual transverse separation from one another, the mail item is moved on in the transport direction. The lateral separation of corresponding rollers of a roller pair can here be set so as to produce a defined rotation of the mail item in the roller pair in question, and to set a displacement of the mail item.

The known rotating devices and methods, in which the entire rotating process is carried out in at least two partial steps, are, however, found to be disadvantageous, since the separation of the pivot points in the lateral direction (transport direction) is fixed and cannot be adapted. This is particularly disadvantageous if the same rotating device is to be used to process products, for example, sheets, having different formats. Moreover, in the case of the known rotating devices and methods, in which the entire rotating process is carried out in partial steps in several rotating devices arranged one after the other, there is a risk that, at the time of the transfer of the product from one rotating direction into the subsequent rotating direction, buckling or stretching of the product occurs, which can damage the product or lead to failures of the rotating devices. In the known rotating devices, the rotating devices located one after the other in the transport direction are arranged at a fixed and short mutual separation. When processing products with larger dimensions, in particular, this leads to the possibility that a product can be engaged simultaneously in two adjacent rotating devices, which can lead to the product being stretched, buckled or bent, and damaged as a result.

SUMMARY

Based on the above, one aspect of the invention provides a device and a method for rotating flat products moved in a transport direction, by means of which products of different formats can be processed at the highest possible throughput and failure-free to the extent possible. The products to be rotated here should be treated in a mild manner, so that no damage to the product can occur during the rotating process.

In the device according to the invention and in the method according to the invention, the rotating of a product, which is moved in a transport direction by the predetermined total rotation angle, is divided into two or more partial steps, wherein each partial step of the rotation occurs in a rotating device provided for that purpose. The device according to the invention for that purpose contains at least one rotating device and a second rotating device, which are both arranged in the transport direction one after the other and at a mutual separation, and which each comprise rotating means that engage with the product to achieve the rotating. In the first rotating device, the product is rotated by a first rotation angle and in the second rotating device by a second rotation angle, and optionally in additional rotating devices arranged one after the other in the transport direction by additional rotation angles, until the total rotation angle is reached. According to the invention, at least the first and the second rotating devices comprise, and advantageously each additional optionally present rotating device comprises, switchable engagement means, by means of which the rotating means can be made to engage with or disengage from the product at selected times.

In this manner, the rotating process can be uncoupled in the first rotating device and the second rotating device, and it can be ensured that the product, during a rotating process, is always engaged with only one rotating device, so that no buckling, stretching or twisting of the product can occur.

As a result of the uncoupling of the rotating processes in the first rotating device and the second rotating device, the separation of the rotating points can be selected independently of the format of the product. Moreover, the beginning of the rotating process in the first or the second rotating device can be selected as desired and adapted, for example, to the format of the product or to the desired position and orientation of the product after the rotating process. As a result, it is possible, for example, to set or compensate for a lateral displacement of the product in a lateral direction (transversely to the transport direction). By subdividing the entire rotating process by the total rotation angle into at least two partial steps, with a first partial step in which the product is rotated by the first rotation angle, and a second partial step in which the product is rotated by the second rotation angle, a longer rotation duration is available for the total rotation process (while the transport speed of the product along the transport direction remains the same), allowing the prevention of large accelerations of the product before and after the rotating processes.

In the method according to the invention, it is provided that the rotating means of the first rotating device are disengaged from the product at selected times by switchable engagement means, while the product is in engagement with the rotating means of the second rotating device. As a result, a defined transfer of the product from the first rotating device to the second rotating device can occur, without the product being stretched, buckled or bent.

In order to rotate the product, the latter is brought at least for a first rotation duration (t1) by the switchable engagement means in engagement with the rotating means of the first rotating device, in order to rotate the product first in the first rotating device by a certain rotation angle ($\alpha 1$). During this first rotation duration (t1), the switchable engagement means disengage the product from the rotating means of the second rotating device, so that the product is engaged only with the first rotating device. After the elapse of the first rotation duration (t1), the product is then brought by the switchable engagement means in engagement with the rotating means of the second rotating device at least for a second rotation duration (t2), in order to rotate the product in the second rotating device by a second rotation angle. The switchable engagement means disengage the product during this second rotation duration (t2) from the rotating means of the first rotating device, so that the product is engaged only with the second rotating device. After the elapse of the first rotation duration (t1), the product is advantageously first continued to be moved on linearly in transport direction (x) without rotation, and subsequently it is transferred to the second rotating device, wherein, for the transfer of the product from the first rotating device to the second rotating device, the switchable engagement means disengage the product from the rotating means of the first rotating device and engage it with the rotating means of the second rotating device.

For the transfer of the product from the first rotating device to the second rotating device, it is advantageous therefore for the first rotating process in the first rotating device to be followed by a transport phase that is uncoupled from the rotating phase, in which the product that has been rotated by the first rotation angle continues to be transported first (without rotation) linearly in the transport direction, and is then transferred to the second rotating device, by having the switchable engagement means disengage the rotating means of the first rotating device from the product and engage the rotating means of the second rotating device with the product. Here, it is advantageous if the product, during an overlap duration, is engaged both with the rotating means of the first rotating device and with the rotating means of the second rotating device, and the product, during this overlapping time, is moved preferably at constant speed linearly and without rotation in the transport direction. This ensures that the product will be engaged at all times securely with at least one rotating device, and can continue to be moved during the entire process at constant speed in the transport direction.

After the transfer to the second rotating device, the product is preferably first moved on linearly in the transport direction (x) without rotation, and subsequently it is rotated for a second rotating duration (t2) in the second rotating device by a predetermined second rotation angle. In this manner, the product is rotated in at least two uncoupled rotating phases by a total rotation angle α, wherein the sum of the first rotation angle α1 and of the second rotation angle α2 corresponds to the total rotation angle α, which is 90°, for example. However, the entire rotating process can also be divided into more than two rotating phases, for which purpose additional rotating devices then follow behind the second rotating device in the transport direction.

It is preferable for the entire rotating process in the method according to the invention to be divided into two partial steps, so that the sum of the first rotation angle in the first rotating process and of the second rotation angle in the second rotating process yields the desired total rotation angle. The desired total rotation angle is here 90°, for example, if the product to be rotated is to be rotated from a first orientation in the upright format into a second orientation in the cross format (or vice versa). However, the method according to the invention is not limited to rotating products by a total rotation angle of 90°. Rather, any desired rotation angle can be achieved with the method according to the invention. The rotation angle (first rotation angle, second rotation angle, and optionally additional rotation angles in additional rotating devices of the device according to the invention) that is produced in the individual rotating steps here depends on a speed difference of the rotating means in the first or second rotating device or any optional additional rotating devices present.

In a preferred embodiment of the invention, it is provided that each rotating device comprises first rotating means and second rotating means, which are arranged in the transverse direction (y) to the transport direction (x) at a mutual lateral separation, and are driven in rotation by a motor either at different rotating speeds in order to drive the product to be rotated, or at the same rotation speeds in order to move the product linearly (without rotation), while the product is engaged with the rotating means. It is preferable for the lateral separation between the corresponding rotating means of the first rotating device and/or the second rotating device to be settable, and in particular to be adaptable to the format of the product. This further improves the use of the method according to the invention for rotating different products having different formats and dimensions.

In an embodiment example of the invention, the rotating means are rotating roller pairs with mutually corresponding rollers. The switchable engagement means are here arranged in such a manner that they move corresponding rollers of the rotating roller pair toward each other or apart from each other, in order to engage or disengage the product with regard to the corresponding rollers of the rotating roller pairs. In this embodiment example, the first rotating device and/or the second rotating device comprise/s a first rotating roller pair and a second rotating roller pair, wherein the first rotating roller pair and the second rotating roller pair are arranged at a mutual lateral separation in the transverse direction (y) relative to the transport direction (x), and are driven in rotation by a motor at different rotation speeds in order to rotate the product.

In an alternative embodiment example of the invention, the rotating means are moving conveyor belts with corresponding rotating rollers. In this embodiment example, the switchable engagement means move the rotating rollers onto the respective associated conveyor belt or away from it, in order to engage or disengage the product with regard to the rotation means.

In an additional alternative embodiment example of the invention, the rotating means are formed by vacuum belts, which can be driven at different speeds, and to which a negative pressure can be applied in a switchable manner. In this embodiment example, the switchable engagement means apply a negative pressure to the vacuum belts to cause the product to engage with the vacuum belts. In order to disengage the product from the vacuum belts, the negative pressure is switched off by the switchable engagement means.

Before the first rotating device, viewed in the transport direction, it is advantageous to arrange a pull-in device, which first moves the product located in the first orientation linearly in the transport direction, and then transfers it to the first rotating device. After the second rotating device, viewed in the transport direction, an additional transport device can be optionally arranged, which takes over the product arriving from the second rotating device, and first continues to move it linearly in the transport direction, and subsequently transfers it to an optionally present additional rotating device or to another follower device, such as, for example, a collecting station or a folding station or an enveloping device. The follower device here can be, in particular, an orientation device for orienting the product. By means of such an orientation device, any angle errors that are already present at the time of the inlet entry of the product into the first rotating device, or that were produced during the rotating process in the first or second rotating device, can be compensated for, so that the rotated product is in a perfect position and orientation at the end of the entire rotating process.

BRIEF DESCRIPTION OF THE DRAWING

These and additional features and advantages of the invention result from the following embodiment examples described in further detail with reference to the accompanying drawings. The drawings show.

DETAILED DESCRIPTION

Figure 1:
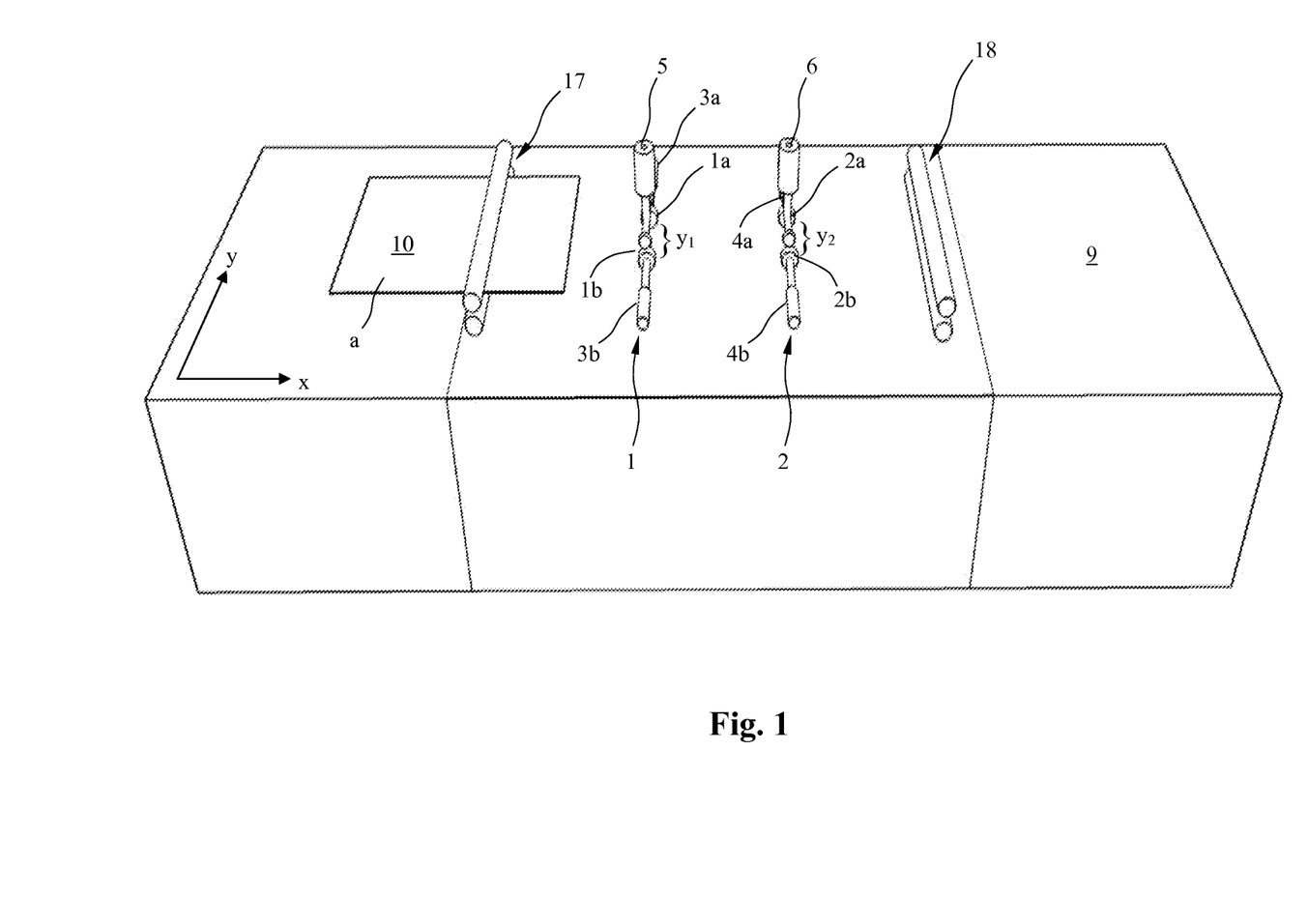
FIG. 1: a schematic representation of a device according to the invention for rotating flat products, in a perspective top view and in a first phase of the method according to the invention.

The device represented schematically in FIG. 1 for rotating flat products 10 about an axis that is perpendicular to the plane of the product 10 comprises a pull-in device 17 (shown only schematically here), which moves the products 10 linearly in transport direction x. The pull-in device 17 can be, for example, a conveyor belt, in particular a vacuum belt, or—as represented in the figures—transport rollers or the like. Moreover, the device comprises a first rotating device 1 and a second rotating device 2 arranged after the pull-in device 17 in transport direction x. The second rotating device 2 is followed in transport direction x by a transport device 18 as well as a follower device 9 (shown only schematically here).

In the embodiment example depicted in FIG. 1, the two rotating devices 1, 2 have substantially the same structure and they each comprise rotating means 1a, 1b; 2a, 2b for rotating the product 10. In the first rotating device 1, the product is rotated by a predetermined first rotation angle $\alpha 1$ and later, in the second rotating device 2, the product 10 is rotated by a predetermined second rotation angle $\alpha 2$. As a result of the rotating of the product 10 in the first rotation direction 1 by the first rotation angle $\alpha 1$ and subsequently in the second rotating device 2 by the second rotation angle $\alpha 2$, the product in the device is imparted a total rotation by a total rotation angle $\alpha = \alpha 1 + \alpha 2$. In many applications, a rotation of the product 10 by a total rotation angle of $\alpha = 90°$ is required. In this application case, the two predetermined rotation angles $\alpha 1$ and $\alpha 2$ can be selected to be symmetrical, for example, $\alpha 1 = \alpha 2 = 45°$. However, an asymmetric division of the two partial turns in the first rotating device 1 and the second rotating device 2 is also possible, such as, for example, $\alpha 1 = 30°$ and $\alpha 2 = 60°$, or vice versa.

The rotating means of the two rotating devices 1 and 2 comprise, in the embodiment example shown in FIG. 1, in each case a first rotating roller pair 1a or 2a, and a second rotating roller pair 1b or 2b. The first rotating roller pair 1a, 2a and the second rotating roller pair 1b, 2b are here each arranged at a mutual lateral separation y1 or y2 in the transverse direction y relative to the transport direction x. Each rotating roller pair 1a, 2a; 1b, 2b here comprises in each case an upper roller and a bottom roller, each mounted rotatably about an axle extending in the transverse direction y. Between each upper roller and the lower roller associated with it, a slit is formed, with which the product 10 can engage. Of each rotating roller pair 1a, 1b or 2a, 2b, either the upper roller and/or the lower roller is/are coupled to a motor 3a, 3b; 4a, 4b, and is/are driven in rotation by this motor. In order to rotate a product 10 that has been moved to engage with the first rotating roller pair 1a and the second rotating roller pair 1b of the first rotating device 1, the rollers of the first rotating roller pair 1a and the rollers of the second rotating roller pair 1b can be driven at different speeds by the respective associated motor 3a, 3b. When setting different speeds of the first rotating roller pair 1a and of the second rotating roller pair 1b, the product 10 engaged with the first rotating device 1 is rotated by a predetermined rotation angle $\alpha 1$. The rotation angle $\alpha 1$ here depends on the speed difference between the first rotating roller pair 1a and the second rotating roller pair 1b. Accordingly, a product 10 that is engaged with the two rotating roller pairs 2a and 2b of the second rotating device 2 can be rotated by a predetermined rotation angle $\alpha 2$ by having the rollers of the first rotating roller pair 2a and the rollers of the second rotating roller pair 2b be driven by the associated motors 4a, 4b at different speeds. It is preferable for the rotating roller pairs 1a, 2a or 1b, 2b located on one side with respect to the longitudinal center plane of the device to be driven at a constant predetermined speed, which advantageously corresponds to the transport speed of the pull-in device 17. For rotating the product 10, the corresponding rotating roller pair that faces said product laterally is then driven at a lower or at a higher speed in order to produce a rotation of the product 10.

The rotating means 1a, 1b; 2a, 2b of the first and of the second rotating device can also be driven at the same speed by the associated motors 3a, 3b; 4a, 4b. In this case, the rotating means 1a, 1b; 2a, 2b produce a linear movement of the product 10 (without rotation) in transport direction x when the product is engaged with the rotating means 1a, 1b of the first rotating device 1 or with the rotating means 2a, 2b of the second rotating device 2.

In each case, switchable engagement means 5 and 6 are associated with the rotating means 1a, 1b; 2a, 2b of the first and of the second rotating device. By means of these switchable engagement means 5 and 6, the rotating means 1a, 1b of the first rotating device 1 and the rotating means 2a, 2b of the second rotating device 2 can in each case be engaged with or disengaged from a product 10 independently of each other. For controlling this switchable engagement means 5 and 6, these are coupled to a control device (not represented here in the drawing). By means of this control device, the times and phases in which the product is engaged or disengaged with the rotating means 1a, 1b; 2a, 2b of the first or of the second rotating device can be established. The control device establishes at which speeds the motors 3a, 3b and 4a, 4b of the first or of the second rotating device run. As a result, it is possible to control via the control device whether the rotating means 1a, 1b; 2a, 2b of the first or of the second rotating device turn with different or with the same speeds, in order to either turn the product, or transport it linearly without rotation.

The switchable engagement means 5 and 6 can be, for example, hydraulic or pneumatic cylinders or motors, which engage or disengage the rotating means 1a, 1b; 2a, 2b of the first or of the second rotating device with regard to the product. When the rotating means are formed in each case by corresponding rollers, it is possible, for example, to couple one of the rollers with an associated engagement means 5 or 6, and the engagement means 5 or 6 can move the corresponding rollers toward each other or apart from each other in order to engage them with or disengage them from the product 10.

Figure 2:
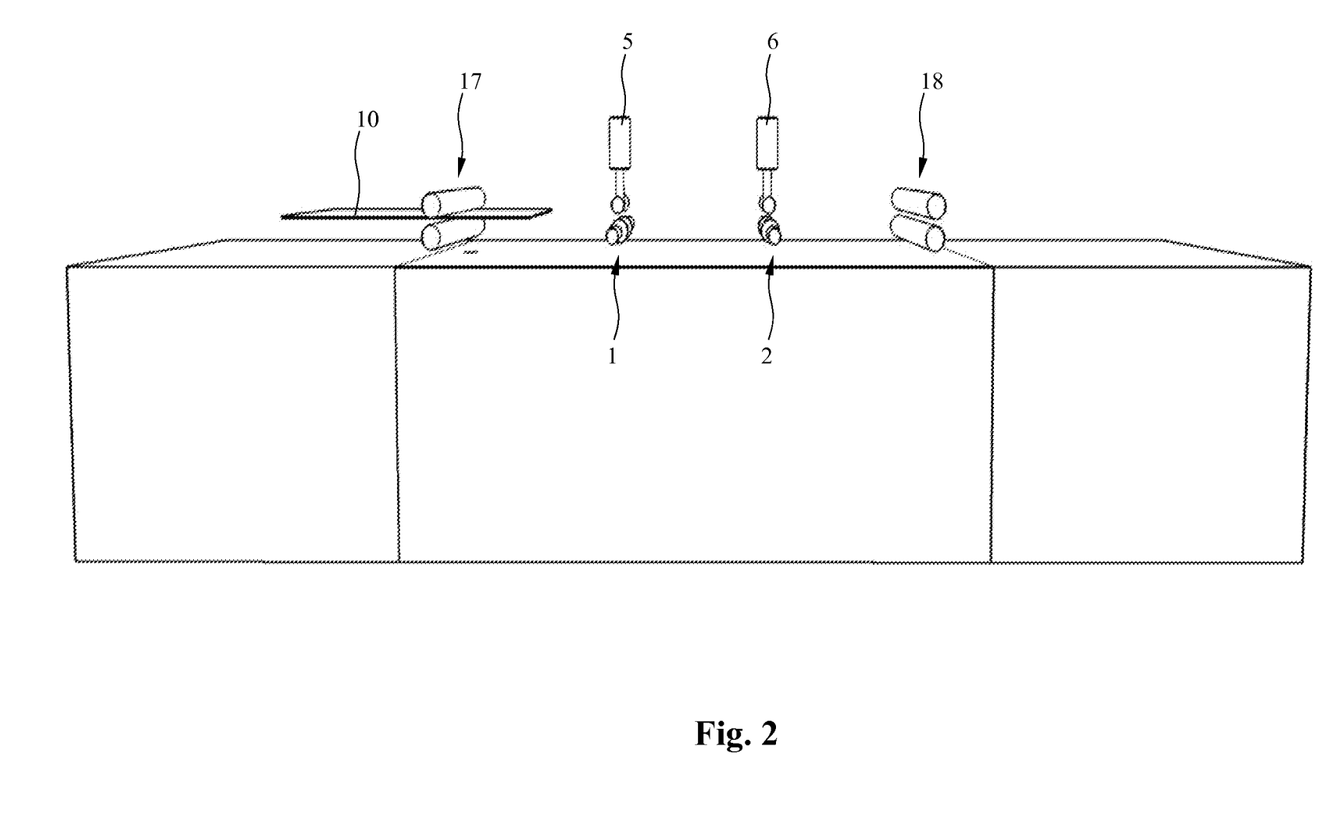
FIG. 2: a schematic representation of the device of FIG. 1 in a perspective side view and in a first phase of the method according to the invention.
Figure 3A:
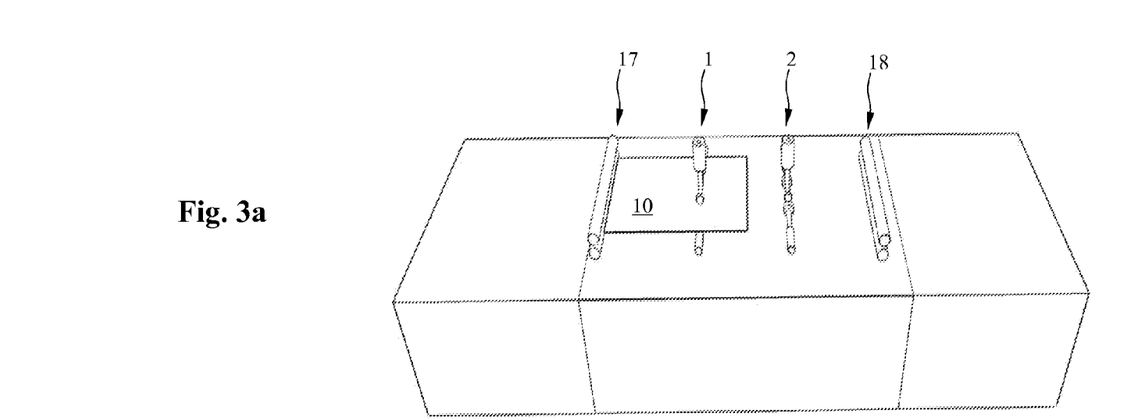
FIG. 3: a schematic representation of the device of FIG. 1 in various phases of the method according to the invention, in a perspective top view (FIGS. 3a, 3c, 3e, 3g, 3j, 3l) and in a perspective side view (FIGS. 3b, 3d, 3f, 3h, 3k, 3m).
Figure 3B:
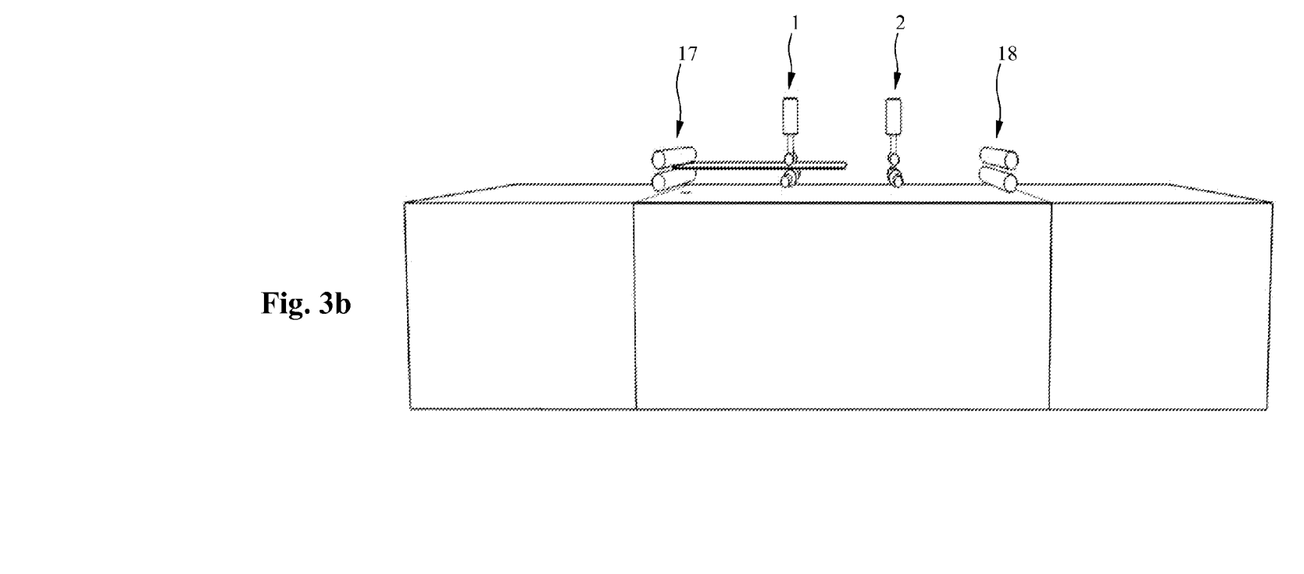
Figure 3C:
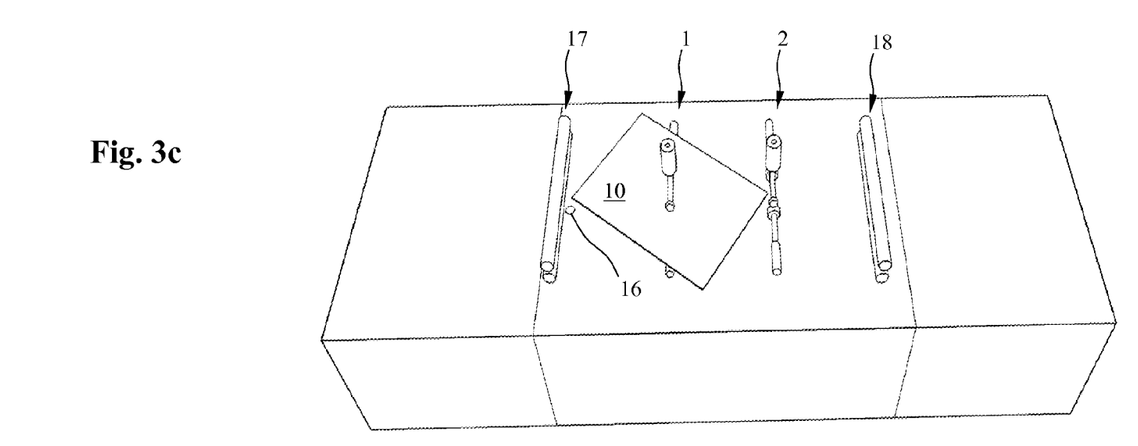
Figure 3D:
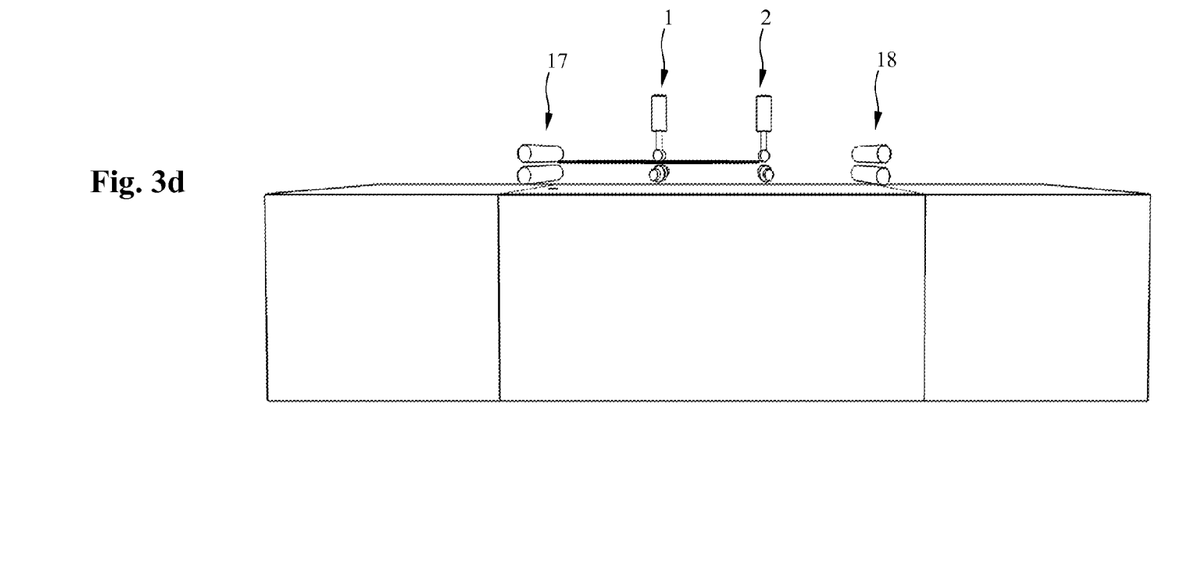
Figure 3E:
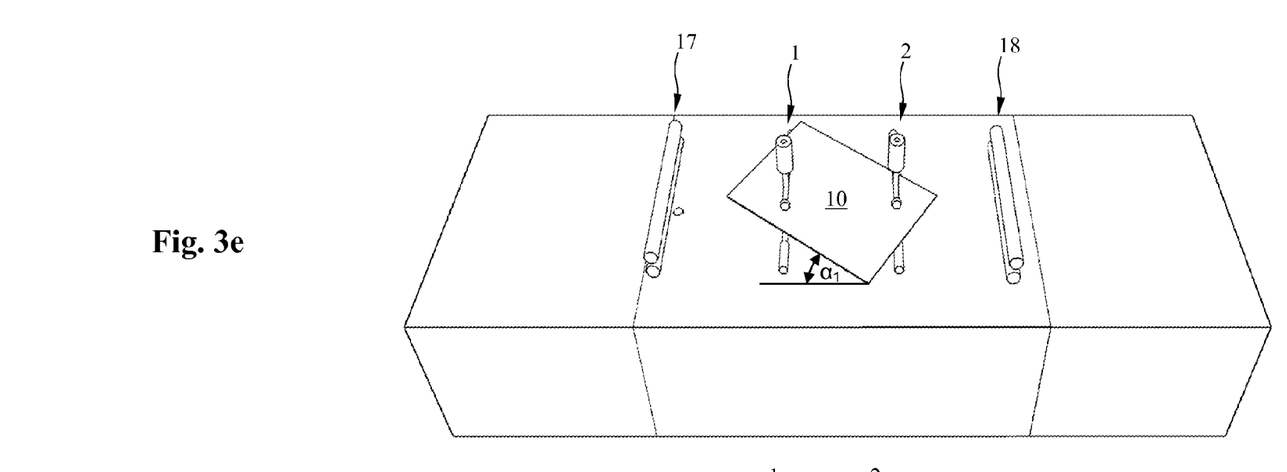
Figure 3F:
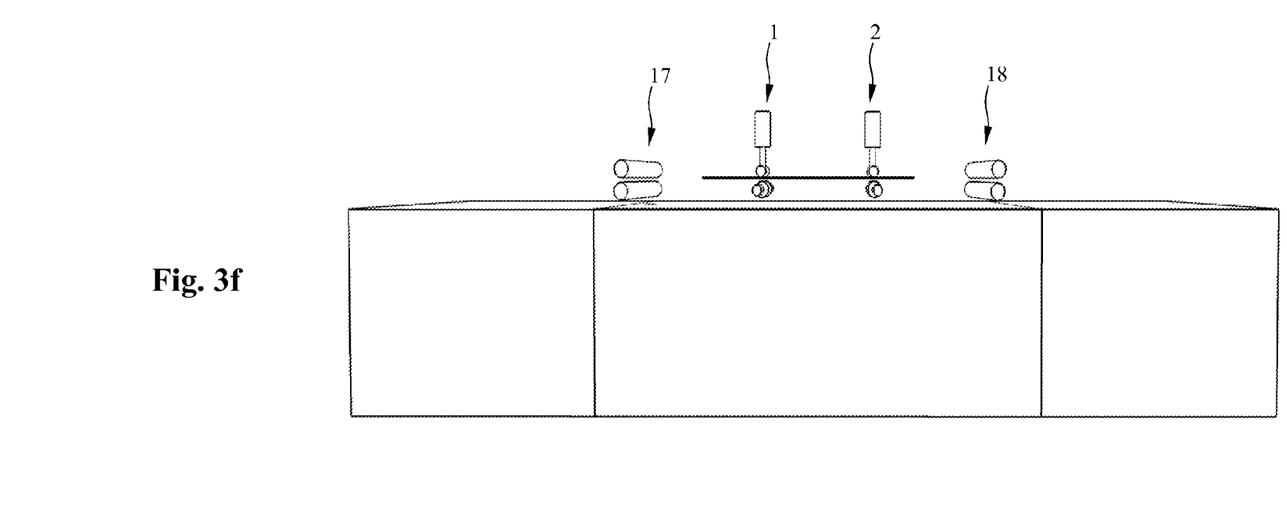

For rotating a product 10 by a total rotation angle $\alpha$, which can be 90°, for example, the device depicted in FIGS. 1 and 2 is operated as follows (FIG. 3):

The pull-in device 17 moves the product 10 located in a first orientation a advantageously at a constant speed linearly in transport direction x relative to the first rotating device 1 (FIGS. 3a and 3b). The first rotating device 1 takes over the moving product 10, in that the switchable engagement means 5 of the first rotating device 1 cause the rotating means 1a, 1b to engage with the product 10. After the first rotating device 1 has taken over the product 10, while maintaining the (advantageously constant) transport speed, it first continues to transport the product 10 linearly over a predetermined intake distance in transport direction x. For this purpose, the rotating roller pairs 1a, 1b of the first rotating device 1 are driven by the associated motors 3a, 3b at the same speed. Starting at a selectable time, which is predetermined by the control device, the first rotating device 1 starts to rotate the product 10 engaged with said rotating device for a rotation duration t1 predetermined by the control device (FIGS. 3c and 3d), by a change in the speed of a rotating roller pair 1a or 1b relative to the other rotating roller pair 1b or 1a. As a result of the different speeds of the first rotating roller pair 1a and of the second rotating roller pair 1b, the product 10 is rotated, until a predetermined first rotation angle $\alpha 1$ is reached (FIG. 2d [sic; 3d]). The first rotation angle $\alpha 1$, which is imparted to the product 10 in the first rotating device 1, depends on the difference in the speeds of the first rotating roller pair 1a and of the second rotating roller pair 1b of the first rotating device 1, and it can be controlled accordingly by setting this speed difference. While the product 10 is rotated in the first rotating device 1, it is in engagement with the rotating roller pairs 2a, 2b of the second rotating device, as can be seen in FIG. 3d. When the product has been rotated by a predetermined first rotation angle α1, the speed of the rotating roller pair 1a or 1b is again adapted to the speed of the other rotating roller pair 1b or 1a, so that the two rotating roller pairs 1a, 1b of the first rotating device 1 are again driven at the same speed. As a result, the product 10 is continued to be moved in the first transport device 1 linearly in transport direction x (FIGS. 3e and 3f). This linear transport also occurs advantageously in the first rotation device 1 at the constant transport speed predetermined by the pull-in device 17. The product 10 is continued to be moved in this manner in the first rotating device 1 by a predetermined outlet distance linearly in transport direction x, and subsequently it is transferred to the downstream second rotating device 2.

Figure 3G:
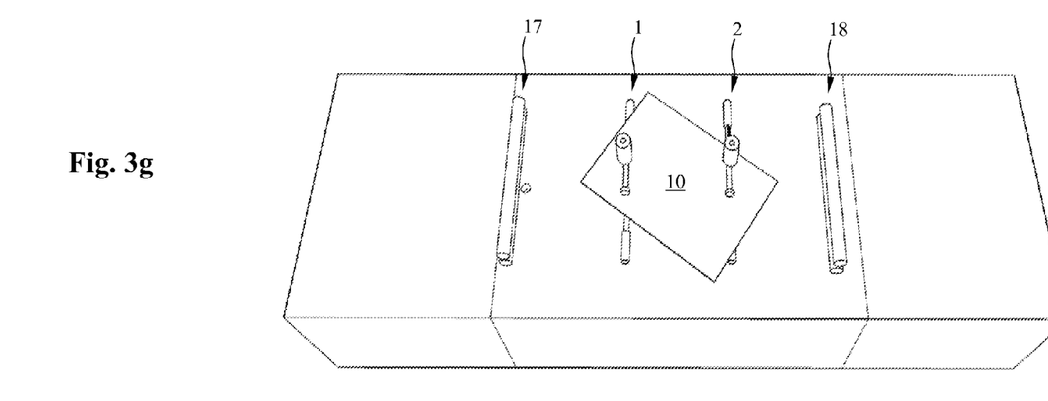
Figure 3H:
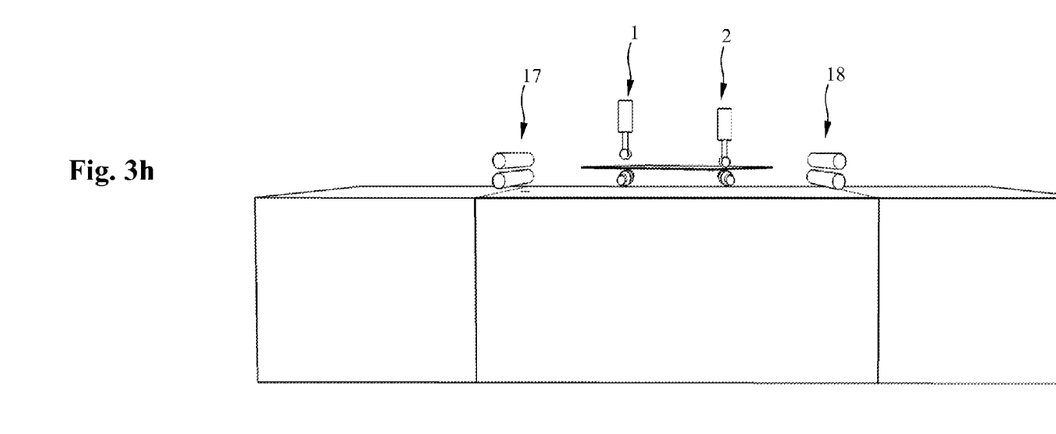

To take over the product 10 rotated by the first rotation angle α1, the second rotating device 2 engages with the product (FIG. 3f), in that the product 10 is moved to engage with the rotating means 2a, 2b of the second rotating device 2. Advantageously, the product 10 remains engaged with the two rotating devices 1 and 2 during an overlap period t3. After the elapse of the overlap time t3 predetermined by the control device, the switchable engagement means 5 of the first rotating device 1 cause the product 10 to be disengaged from its rotating means 1a, 1b thereof, for example, by having the corresponding rollers of the rotating roller pair 1a and 1b move apart from each other, as shown in FIG. 3h. The product 10 is then only engaged with the rotating means 2a and 2b of the second rotating device 2. These are first driven still at the same speed by the motors 4a and 4b, in order to continue to move the product 10 (without rotation) linearly in the second rotation device 2 by a predetermined inlet distance (FIG. 3g). As soon as the product 10 has left the first rotating device 1 and is no longer engaged with the rotating means 1a, 1b, a subsequent product can already be transferred to the first rotating device 1 for serial processing of the products, and be rotated there as described above. This leads to a considerable reduction of the cycle times and thus to an increase in the cycle output and the throughput.

Figure 3J:
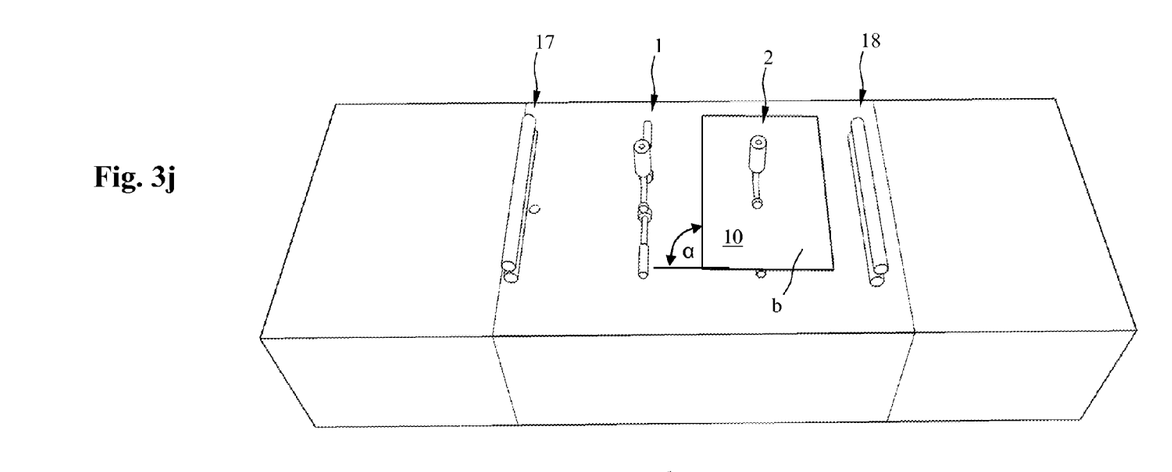
Figure 3K:
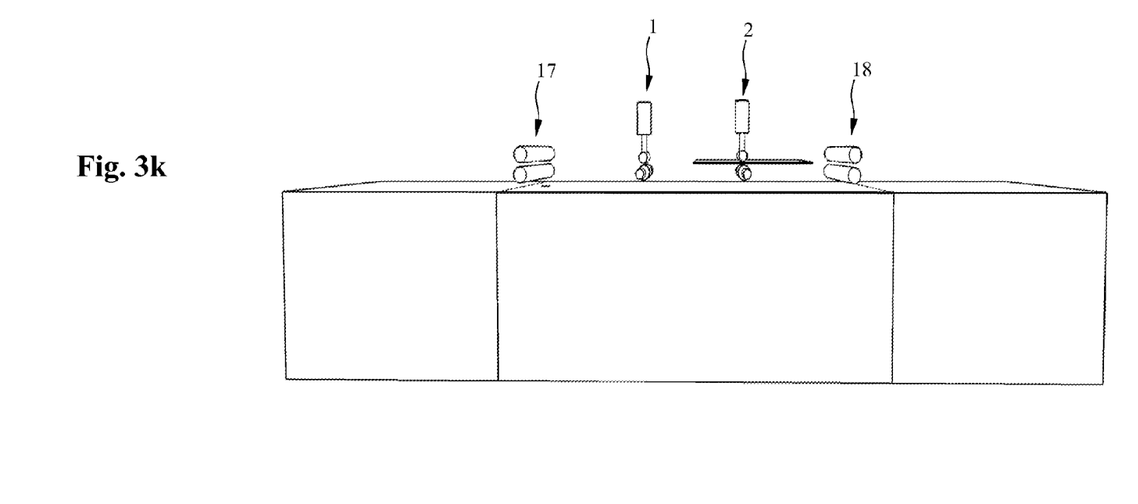

After a duration that is predeterminable by the control device, the rotating roller pairs 2a, 2b of the second rotating device 2 are driven for a second rotation duration t2 at different speeds, as a result of which the product 10 is continued to be rotated in the second rotating direction 2 (FIGS. 3j and 3k). The rotation in the second rotating direction 2 occurs until a predetermined second rotation angle α2 has been reached (FIG. 3j). This depends on the speed difference of the rotating roller pairs 2a, 2b of the second rotating device 2, which is set accordingly. If the product 10 has been rotated in the second rotating device 2 by the predetermined second rotation angle α2, the speeds of the second rotating roller pair 2a and of the second rotating roller pair 2b of the second rotating device 2 are again adapted to one another and are driven at the same speed by the associated motors 4a, 4b. As a result, the product 10 that has been rotated by the total rotation angle α=α1+α2 (FIG. 3j) is continued to be moved in the second rotating direction 2 by a predetermined outlet distance linearly in transport direction x. The speed of this linear movement of the product 10 located then in its second orientation b occurs here also advantageously at the transport speed predetermined by the pull-in device 17. In the case of a rotation of the product 10 by a total rotation angle of α=90°, the product 10 can be rotated, for example, from a first orientation a in the upright format into a second orientation b in the transverse format.

Figure 3L:
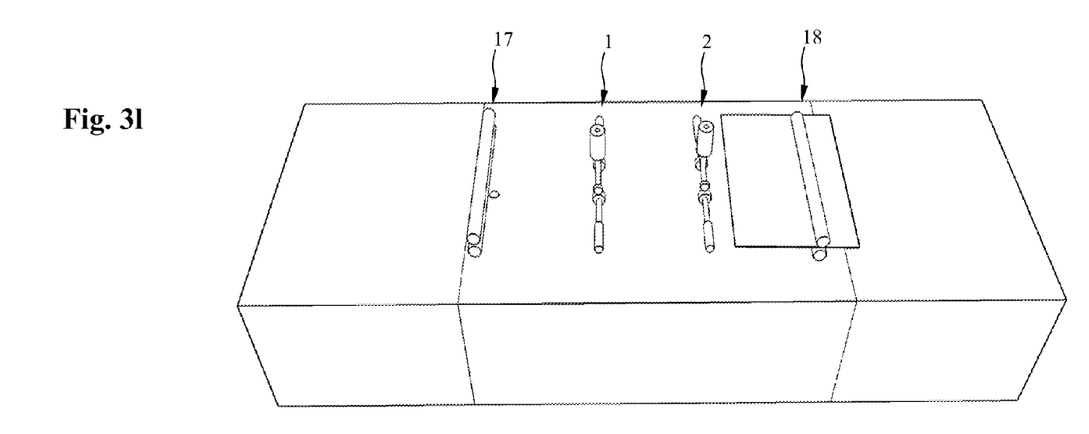
Figure 3M:
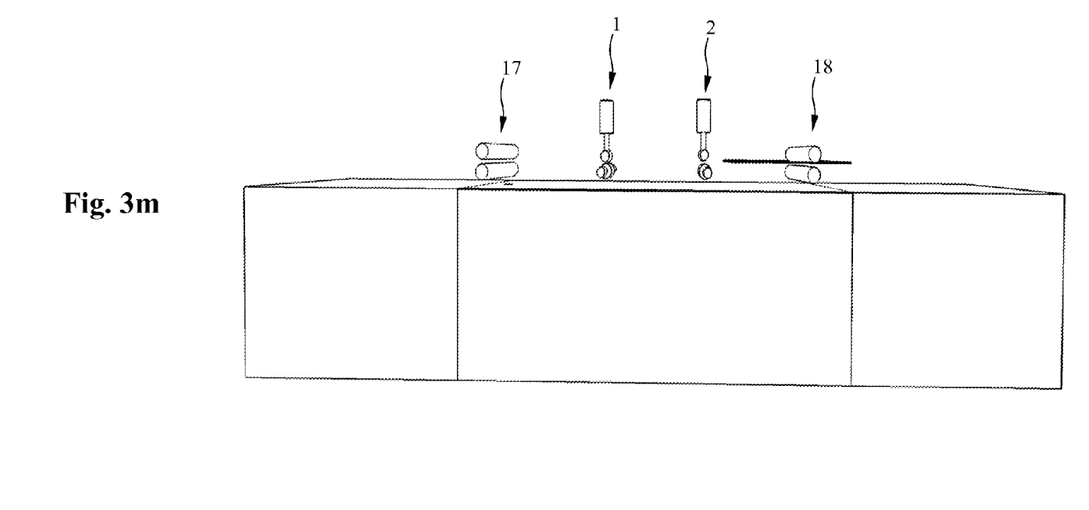

The second rotating device 2 finally leads the product 10 that has been rotated by the total rotation angle α to the down-stream transport device 18 (FIG. 3f). The latter takes over the product 10 that is now in the second orientation b, and transports it linearly in transport direction x to a subsequent follower device 9 (FIGS. 3l and 3m). The follower device 9 can be, for example, an alignment device, by means of which a fine alignment of the orientation and the position of the rotated product 10 can be carried out. The follower device 9 can also be a device for further processing the product 10, such as, for example, a collecting station or a folding station or an enveloping device, which introduces the rotated product 10 into an envelope.

In an additional embodiment of a device according to the invention, which is not represented in the drawing, the rotating means of the first and of the second rotating device are formed in each case by circulating vacuum belts 1a, 1b and 2a, 2b, wherein corresponding vacuum belts 1a, 1b or 2a, 2b are mutually arranged in transverse direction y at a lateral separation, and are driven at different speeds or at the same speeds, in order to rotate the product 10, or transport it linearly. The vacuum belts 1a, 1b; 2a, 2b can be exposed to a negative pressure by engagement means 5, 6 in a switchable on or switchable off manner, in order to suction the product 10 located on the respective vacuum belt and cause it to engage with the respective rotation device 1, 2. The engagement means 5 and 6 here includes pumps and associated pump lines with switchable valves, which are able to apply negative pressure to the vacuum belts 1a, 1b in a switchable on and switchable off manner.

The invention is not limited to the embodiment example represented in the drawing. Thus, for example, the rotating means of the first rotating device 1 and/or of the second rotating device 2 can be designed differently. Instead of rotating roller pairs 1a, 2a; 1b, 2b that work together, it is also possible to use as rotating means, for example, conveyor bands or belts and rollers that work with them. In principle, any devices can be used as rotating means that are capable of imparting a defined rotation to a moving product 10. Moreover, it is possible to design the rotating means of the first and/or of the second rotating device 1 or 2 in such a manner that they can engage with or be disengaged from the product individually and independently of one another. Thus, for example, it is possible for only the rotating means 1a to engage with the product, but not the corresponding rotating means 1b of the first rotating device 1.

Additionally, sensors, particularly optical sensors, can be used in the devices according to the invention, in order to detect the position and optionally an orientation of the product 10 in different phases of the rotating process. For example, in FIG. 3c, a sensor 16 for detecting the front edge of the product 10 is represented. The signals detected by the sensors are here transferred to the control device for controlling the rotating devices 1, 2, and in particular for controlling the motors 3a, 3b; 4a, 4b, which drive the rotating means of the first rotating device 1 or of the second rotating device 2. As a result of the use of such sensors, it is possible, for example, to detect the orientation of the product 10 in intermediate steps of the rotating process, and to correct it in the subsequent steps, if an erroneous orientation has been detected by the sensors.

In the embodiment examples described here, the entire rotating process is divided into two partial steps, namely a first partial step in the first rotating device 1 and a second partial step in the second rotating device 2. It is also possible to divide the entire rotating process into more than two partial steps, and to provide for this purpose additional rotating devices, which then follow the second rotating device 2 or the subsequent transport device 18 viewed in transport direction x, and/or which are arranged before the first rotating device 1.

All references cited herein are expressly incorporated by reference in their entirety. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed is:

1. A device for rotating a flat product, the product moved in a transport direction from a first orientation into a second orientation by a predetermined total rotation angle, the predetermined total rotation angle including two or more partial rotation angles, the device comprising:
   a first rotating device in which the product is rotated first by a first partial rotation angle in a first rotation step, the first rotating device including a first rotating element for engaging the product for rotation thereof;
   at least a second rotating device in which the product is rotated by a second partial rotation angle in a second rotation step, the second rotating device including a second rotating element for engaging the product for rotation thereof;
   wherein the first rotating device and the second rotating device are spaced at a distance from each other and are arranged one after the other in the transport direction;
   wherein the first rotating device includes a first switchable engagement element for selectively engaging or disengaging the first rotating element with the product at selected times;
   wherein the second rotating device includes a second switchable engagement element for selectively engaging or disengaging the second rotating element with the product at selected times; and
   wherein the first rotation step and the second rotation step are uncoupled by the first switchable engagement element and the second switchable engagement element such that the product is engaged with only one of the rotating devices at a given time during rotation.

2. The device according to claim 1, wherein each of the first rotating element and the second rotating element comprises first and second rotators and wherein the first and second rotators of the first rotating element are arranged in mutual lateral separation in a direction transverse to the transport direction and the first and second rotators of the second rotating element are arranged in mutual lateral separation in a direction transverse to the transport direction.

3. The device according to claim 2, wherein the first rotator and the second rotator of the first rotating element are driven in rotation by a motor at different rotating speeds in order to rotate the product or are driven in rotation by a motor at the same rotating speeds in order to move the product linearly without rotation of the product.

4. The device according to claim 2, wherein the first and second rotators of the first rotating element and the first and second rotators of the second rotating element are rotating roller pairs having mutually corresponding rollers and the first and second switchable engagement elements move corresponding rollers of rotating roller pairs toward each other or apart from each other in order to engage and disengage the product.

5. The device according to claim 2, wherein lateral separation of the first and second rotators of the first rotating element is settable and adaptable to a format of the product and wherein lateral separation of the first and second rotators of the second rotating element is settable and adaptable to the format of the product.

6. The device according to claim 1, wherein, during rotation of the product in the first rotation step, the product is engaged with the first rotating element and the second switchable engagement element disengages the product from the second rotating element, and;
   wherein, during rotation of the product in the second rotation step, the product is engaged with the second rotating element and the first switchable engagement element disengages the product from the first rotating element.

7. The device according to claim 1, wherein, after completion of the first rotation step, the product continues to be moved linearly without rotation in the transport direction for transfer to the second rotating device and the first switchable engagement element disengages the product from the first rotating element and the second switchable engagement element engages the product with the second rotating element.

8. The device according to claim 1, wherein, during transfer of the product from the first rotating device to the second rotating device, the first switchable engagement element and the second switchable engagement element engage the product with the first rotating element and the second rotating element at the same time such that the product is moved linearly at a constant speed in the transport direction.

9. The device according to claim 1, wherein the sum of the first partial rotation angle and the second partial rotation angle is smaller than or equal to the total rotation angle.

10. The device according to claim 1, further comprising a pull-in device arranged upstream the first rotating device for transferring the product linearly in the transport direction in the first orientation to the first rotating device and further comprising a transport device arranged downstream the second rotating device for transferring the product linearly in the transport direction from the second rotating device to a further rotating device or to a follower device.

11. A method for rotating a flat product in which the product is moved in a transport direction from a first orientation into a second orientation by two partial rotation steps, the method comprising:
   rotating the product from the first orientation by a first partial rotation angle with a first rotating device in a first partial rotation;
   rotating the product by a second partial rotation angle with a second rotating device into the second orientation in a second partial rotation;
   disengaging the product from the first rotating device with a first switchable engagement element when the product is engaged with the second rotating device;
   disengaging the product from the second rotating device with a second switchable element when the product is engaged with the first rotating device;
   whereby the first partial rotation and the second partial rotation are uncoupled at selected times by the first switchable engagement element and the second switchable engagement element such that the product is engaged with only one of the rotating devices at a given time during rotation.

12. The method according to claim 11, wherein the first rotating device comprises first and second rotators arranged in mutual lateral separation in a direction transverse to the transport direction and wherein rotating the product includes using a first motor to drive the first and second rotators of the first rotating device in rotation at different rotating speeds in order to rotate the product.

13. The method according to claim 12, further comprising transferring the product from the first rotating device to the second rotating device by using the first motor to drive the first and second rotators of the first rotating device in rotation at the same speed such that the product is transferred linearly without rotation.

14. The method according to claim 13, wherein the transferring includes disengaging the product from the first rotating device and engaging the product with the second rotating device.

15. The method according to claim 12, wherein the first and second rotators of the first rotating device are rotating roller pairs having mutually corresponding rollers, and wherein the product is engaged with the first rotating device by moving the corresponding rollers of the rotating roller pairs toward each other and the product is disengaged from the first rotating device by moving the corresponding rollers of the rotating roller pairs apart from each other.

16. The method according to claim 12, wherein the second rotating device comprises first and second rotators arranged in mutual lateral separation in a direction transverse to the transport direction and wherein rotating the product includes using a second motor to drive the first and second rotators of the second rotating device in rotation at different rotating speeds in order to rotate the product.

17. The method according to claim 16, wherein the first and second rotators of the second rotating device are rotating roller pairs having mutually corresponding rollers, and wherein the product is engaged with the second rotating device by moving the corresponding rollers of the rotating roller pairs toward each other and the product is disengaged from the second rotating device by moving the corresponding rollers of the rotating roller pairs apart from each other.

18. The method according to claim 11, wherein, when rotating the product from the first orientation, the product is engaged with the first rotating device and the second switchable engagement element disengages the product from the second rotation device.

19. The method according to claim 11, wherein, when rotating the product by the second partial rotation angle, the product is engaged with the second rotating device and the first switchable engagement element disengages the product from the first rotation device.

20. The method according to claim 11, further comprising, subsequent to rotating the product from the first orientation, moving the product linearly without rotation in the transport direction for transfer to the second rotating device, disengaging the product from the first rotating device with the first switchable engagement element, and engaging the product with the second rotating device using the second switchable engagement element.

21. The method according to claim 11, further comprising, subsequent to rotating the product from the first orientation to the first partial rotation angle, engaging the first switchable engagement element and the second switchable engagement element with the first rotating device and the second rotating device at the same time, thereby moving the product linearly at a constant speed in the transport direction.

22. A device for rotating a flat product, the product moved in a transport direction from a first orientation into a second orientation by a predetermined total rotation angle, the predetermined total rotation angle including two or more partial rotation angles, the device comprising:
  a first rotating device in which the product is rotated first by a first partial rotation angle in a first rotation step, the first rotating device including a first rotating element for engaging the product for rotation thereof;
  at least a second rotating device in which the product is rotated by a second partial rotation angle in a second rotation step, the second rotating device including a second rotating element for engaging the product for rotation thereof;
  a control device for controlling the first and second rotating devices;
  wherein the first rotating device and the second rotating device are spaced at a distance from each other and are arranged one after the other in the transport direction;
  wherein the first rotating device includes a first switchable engagement element for selectively engaging or disengaging the first rotating element with the product at selected times;
  wherein the second rotating device includes a second switchable engagement element for selectively engaging or disengaging the second rotating element with the product at selected times; and
  wherein the control device controls the first and second switchable engagement elements such that the product is engaged with only one of the first and second rotating devices at a given time, thereby uncoupling the first and second rotation steps from each other.

* * * * *